Oct. 26, 1965   W. R. CALVERT   3,214,388
METHOD OF FORMING METAL OXIDE CATALYTIC PELLETS
Filed June 15, 1961   2 Sheets-Sheet 1
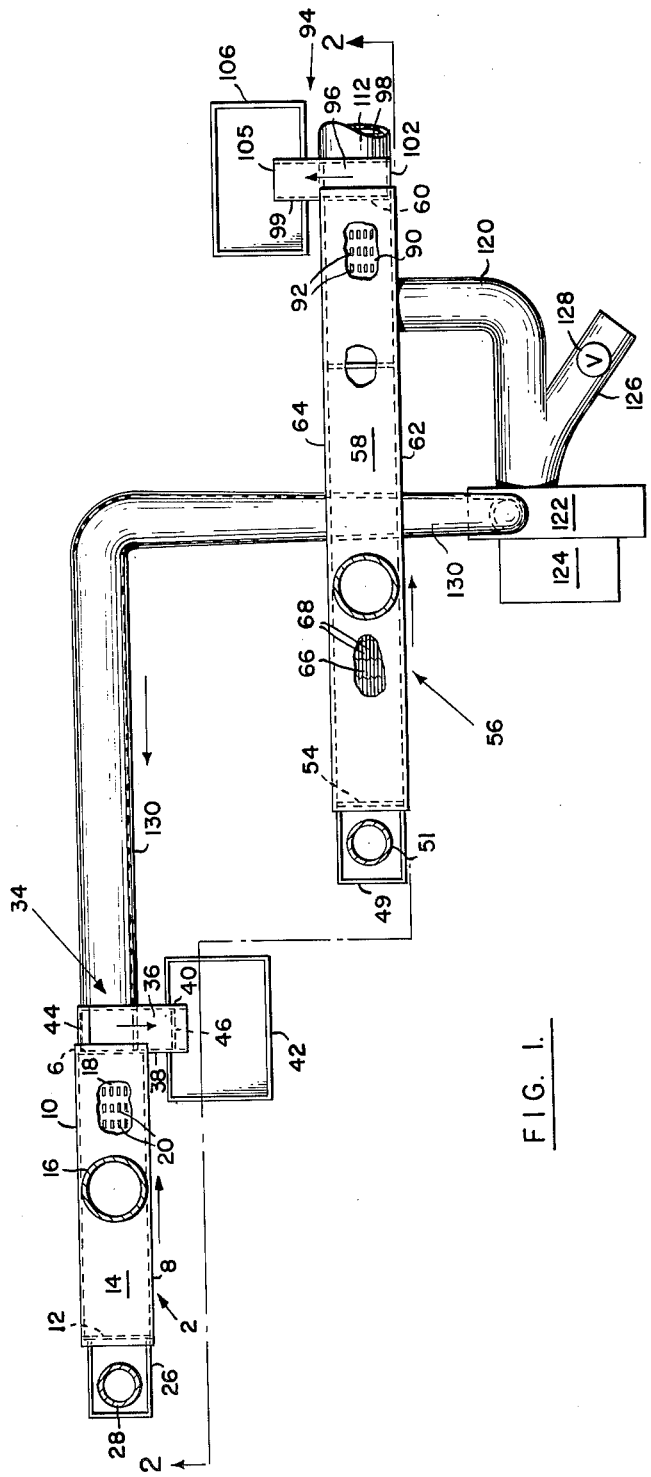
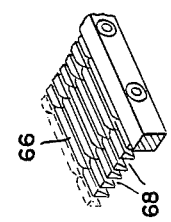
FIG. 4.
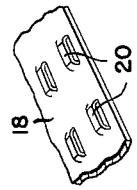
FIG. 3.
*INVENTOR.*
WILLARD R. CALVERT
BY
ATTORNEYS Oct. 26, 1965   W. R. CALVERT   3,214,388
METHOD OF FORMING METAL OXIDE CATALYTIC PELLETS
Filed June 15, 1961   2 Sheets-Sheet 2

INVENTOR.
WILLARD R. CALVERT
BY
ATTORNEYS

United States Patent Office 3,214,388
Patented Oct. 26, 1965

3,214,388
METHOD OF FORMING METAL OXIDE
CATALYTIC PELLETS
Willard R. Calvert, Ridley Park, Pa., assignor to Oxy-Catalyst, Inc., Berwyn, Pa., a corporation of Pennsylvania
Filed June 15, 1961, Ser. No. 117,371
12 Claims. (Cl. 252—437)

This invention relates to a method for forming catalytic pellets and, more particularly, relates to such an invention wherein catalyst pellets are variously subjected to the necessary heating, reduction and cooling while in a fluidized state as contrasted to the conventionally used methods involving treating pellets in batches. It also relates to apparatus useful for carrying out the method.

It is known to form pellets of aluminum trihydrate of a size of from 25 to 10,000 microns in diameter impregnated with phosphoric acid which reacts with a portion of the aluminum trihydrate to form aluminum dihydrogen phosphate. Conventionally batches of such pellets are heated in an oven to react the aluminum dihydrogen phosphate with aluminum trihydrate in the pellets to produce aluminum phosphate which has been found to be an excellent binder for catalyst base pellets. Such pellets are then made catalytically active by heating them at higher temperatures in an oven to convert a portion of the aluminum trihydrate to aluminum oxide.

For certain applications such as, for example, use in exhaust purifiers for automobile engines, thus-formed catalytically active pellets are impregnated with a solution of a salt of a catalytic metal and then subjected to a hot reducing gas to reduce the catalyst metal.

As conventionally carried out in separate batch steps, the above discussed method of forming a catalyst base per se or such a base impregnated with a catalyst metal is subject to the deficiency that it is time-consuming and expensive with respect to the required equipment. Further, oven heating as used in the batch process does not provide uniform heating for each pellet during the entire heating period. With respect to reduction of the catalyst metal salt, the pellets are not evenly subjected to the influence of the reducing gas.

In accordance with this invention, catalyst pellets are made using a continuous process for the heating of the pellets as well as for subjecting the pellets to the reducing gas. In addition, there is provided continuous means for cooling the pellets after they have been subjected to heating in order that they can be handled promptly in conventional receptacles.

For purposes of convenience, the method of this invention will be described in detail with respect to the making of catalytic pellets containing alumina ($Al_2O_3$) from aluminum trihydrate pellets. It will be understood that the method is equally applicable to forming catalytic pellets of or including catalytically active hydroxides or oxides of other metals which form soluble acid phosphates and insoluble phosphates which are phosphates stable at high temperatures of up to 1400° to 2000° F. or above. In lieu of aluminum trihydrate, other metal hydroxides (or equivalently oxides) forming a soluble acid phosphate and insoluble phosphate stable at temperatures up to 1400° to 2000° F. and above may be substituted. Exemplary are hydroxides or oxides of magnesium, iron, manganese, chromium, nickel, zinc, calcium, cadmium, potassium, lead, and beryllium. All of the conditions set forth in detail with respect to the following description are fully applicable to the formation of all of the aforesaid catalytic pellets.

As previously stated, it is known to the art to form substantially round aluminum trihydrate pellets impregnated with phosphoric acid which reacts with a portion of the aluminum trihydrate to form aluminum dihydrogen phosphate. Such aluminum trihydrate-aluminum dihydrogen phosphate pellets of the prior art having a range of from about 25 to about 10,000 microns in diameter advantageously 25 to about 2500 microns in diameter (as used herein "diameter" is intended to mean the size determined by sieve testing), and containing from about 3.0% to about 20.0% by weight of aluminum dihydrogen phosphate are fed into one end of a fluidizing zone. A multiplicity of jets of a gas, advantageously air, at a temperature in the range of from about ambient to about 400° F. preferably from about 125° F. to 212° F. are introduced into the bottom of the fluidized zone from the inlet end to the discharge end of the zone to fluidize the pellets and to react the aluminum dihydrogen phosphate with aluminum trihydrate to form aluminum phosphate which acts as an excellent binder for a catalyst pellet.

In order to have the pellets pass from the entrance end of the fluidized zone to the discharge end, all of the jets are arranged to lie in substantially the same plane which will slope from the entrance end to the discharge end at an angle of up to about 6° to the horizontal. It being desired to produce a shallow fluidized bed of a depth of from about ⅛ inch to about 8 inches, it has been found that a gas velocity of from 70 f.p.m. to about 140 f.p.m. is best employed. The thus produced shallow fluidized bed tends to seek its own level as in the case of water and hence the rate of feed of the pellets at the introduction end of the fluidized zone within wide limits controls the residence time of the individual pellets in the fluidized zone. Variations in residence time can of course, also be produced by variations in the length of the zone from the introduction end to the discharge end. It is advantageous to have the length of the zone from the introduction end to the discharge end from about ½ to 20 feet, while the feed rate per inch of width of the zone advantageously will be in the range of from 0.1 to 2.0 pounds per minute. The residence time for a catalyst pellet in the fluidized zone will be from about 1 second to 3.0 minutes which is extremely short and is only possible due to the very high rate of heat transfer between a gas and a solid.

After the pellets have progressively passed through the aforementioned zone, they have been converted to aluminum trihydrate pellets bound together by an aluminum phosphate binder. If desired, the pellets at this stage can be sieved to obtain a more uniform range of desired size.

It is now desired to convert a substantial proportion of the aluminum trihydrate to aluminum oxide in order to make the pellets catalytically active. This is accomplished by introducing the pellets into a second fluidized zone having all the characteristics of the aforementioned fluidized zone with the exception that the gas in the jets is at a temperature in the range of from about 500° F. to about 1400° F., preferably from about 800° F. to about 1200° F., the feed rate is from 0.05 to 1.0 pound per minute per inch of width of the zone and the length of the zone from the introduction end to the discharge end is from 2.0 to 20 feet. In this second fluidized zone, the residence time will be from about 1.0 to 10.0 minutes and the pellet on being discharged from this second zone will be a mixture of aluminum phosphate binder and AlO(OH) and $Al_2O_3$ which can absorb a minimum of 100 grams of water per pound of pellets. The pellets advantageously will contain from about 10% to about 25% aluminum phosphate binder.

The pellets discharged from the second fluidized zone are cooled and are then completed catalyst pellets where aluminum oxide catalyst pellets are to be used, for example in cracking processes, as is well-known to the art.

When the pellets are to be employed for example as an oxidation catalyst for the treatment of exhaust gases from engines employing leaded gasoline, the pellets are further impregnated with a solution of a salt of an appropriate catalytically active metal, preferably formed with a strong acid such as nitrate, sulphate or chloride salt. Suitable metals for this purpose include advantageously platinum, palladium, silver and copper, or combinations thereof such as silver-chromium, copper-chromium and copper-manganese. Iron, cobalt, vanadium and nickel, by way of further examples, are also suitable. This is normally accomplished by soaking the pellets in such a solution wherein the metal is present in an amount of from about .01% to about 10% by weight. An aqueous solution is preferred. The solution which is not absorbed is then drained off.

In accordance with the method of this invention, the thus impregnated pellets are introduced into a fluidized zone identical in all respects with the second fluidized zone discussed above with the exception that the gas of the jets is at a temperature in the range of from about 400° F. to about 1000° F., advantageously about 800° F. and includes with combustion products and air, a reducing gas such as hydrogen or propane. The feed rate is from about 0.1 to about 2.0 pounds per minute per inch of width of the zone and the length of the zone from the introduction end to the discharge end is from about 2.0 to about 20 feet. The residence time is from about 1.0 to about 10 minutes.

After passing through each of the last discussed zones, it is convenient to pass the hot pellets through a similar fluidized zone in which the fluidizing gas is relatively cool, to cool down the pellets to a convenient handling temperature.

It will be appreciated that the upper limit of the lengths of the zones is not critical in carrying out the method.

*Apparatus*

Suitable apparatus for carrying out the method of this invention is shown in the following drawings in which:

FIGURE 1 is a plane view of apparatus embodying the invention;

FIGURE 3 is a top perspective view partially broken away of a grid embodied in the apparatus of FIGURE 1; and FIGURE 4 is a top perspective view partially broken away of a grid employed in the apparatus of FIGURE 1.

Figure 2:
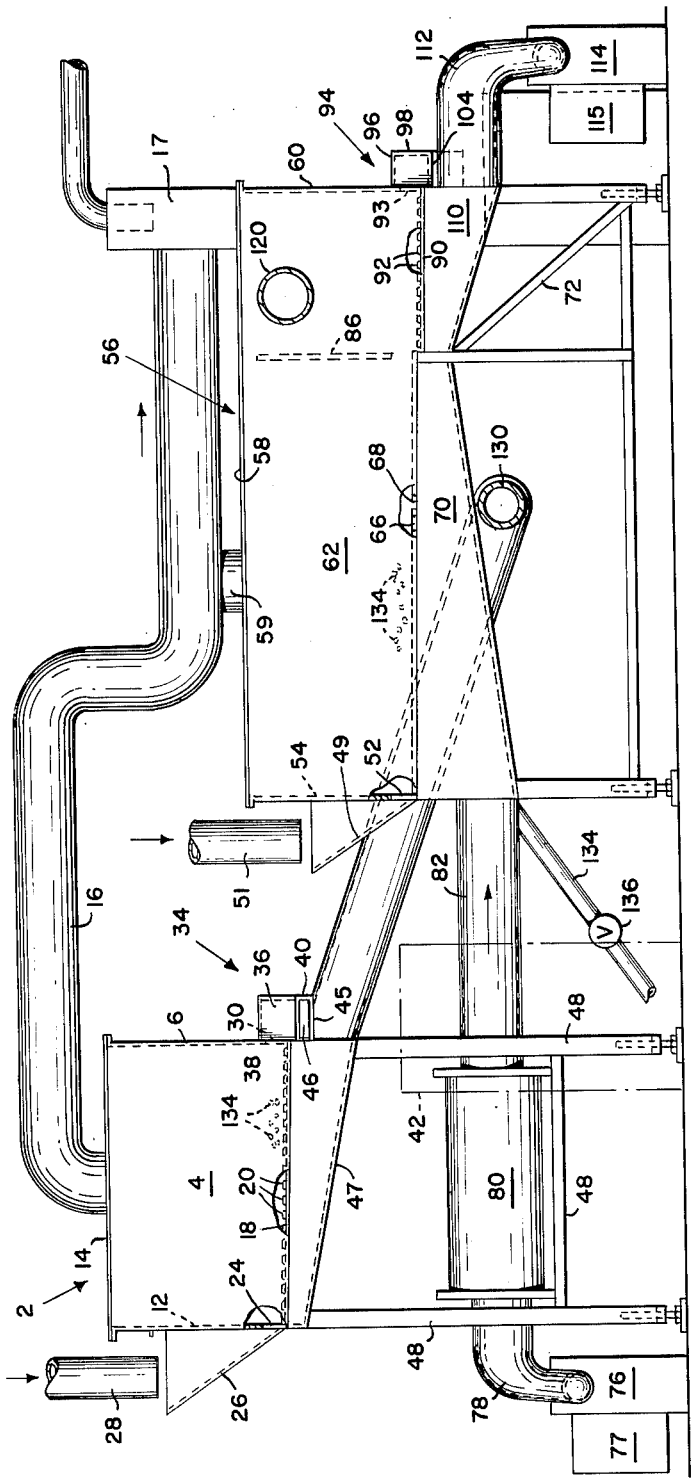
FIGURE 2 is an elevation of the apparatus of FIGURE 1 taken on the plane indicated by the line 2—2 in FIGURE 1.

The method of this invention will be further clarified by a study of the apparatus shown in the drawings in which the method may be carried out.

As shown in the drawings, fluidizing apparatus 2 in accordance with this invention is provided with a fluidizing chamber 4 having side walls 6, 8, 10 and 12, and a top 14 provided with an exhaust conduit 16 which is connected to exhaust blower 17. The bottom of chamber 4 is formed by a three foot long grid 18 having a 3.0° slope downward from left to right and provided with pressed out openings 20. Grid 18 defines the bottom of a fluidizing zone. An inlet opening 24 in wall 12 is supplied with the pellets to be fluidized by a chute 26 which in turn is supplied by a pipe 28 leading from a hopper not shown. Wall 6 is provided with an opening 30 providing a connection with a housing 34 which forms an extension of chamber 4. Housing 34 is provided with a sloping top 36, side walls 38 and 40 and end wall 44. The bottom 45 of housing 34 slopes downwardly away from opening 30 to discharge opening 46. A container 42 collects the pellets discharging through opening 46. Below chamber 4 is provided a manifold chamber 47 supported by framework indicated at 48.

A chute 49 is supplied by pipe 51 with pellets collected in container 45 and carries the pellets through opening 52 in wall 54 of a second fluidizing chamber 56. Chamber 56 is provided with a top 58 with an exhaust conduit 59 connecting into conduit 16 and side walls 60, 62 and 64. A portion of the bottom of chamber 56 is formed by a grid 66 five foot long, having a slope from left to right of 2.0° and provided with openings 68. Grid 66 defines the bottom of a fluidizing zone.

A manifold chamber 70 supported on framework indicated at 72 is positioned below grid 66. Air is supplied to manifold chamber 70 by means of a blower indicated at 76 having a motor 77 and connected to a furnace 80 which in turn is connected to manifold 70 by a conduit 82.

Immediately above the right-hand end of grid 66 as viewed in FIGURE 2, there is provided a vertical partition 86 which extends from a point near the top of the chamber to a point spaced slightly above the plane of grid 66. A 2.0 foot long grid 90 having a left to right slope of 2.0° and constructed like grid 18, is provided with openings 92 and forms a continuation of the bottom of chamber 56 from grid 66 and extends to wall 60 and an opening 93 therein. Grid 90 defines the bottom of a fluidizing zone. A housing 94 forms an extension of chamber 56 and is provided with a top 96, walls 98, 99 and 102 and a bottom 104 sloping downwardly towards a discharge opening 105. A container 106 is positioned below opening 105 for the collection of particles discharged therefrom.

Below grid 90 there is provided a manifold chamber 110 supported by framework 72 which is supplied with room temperature air by duct 112 which in turn is supplied by a blower 114 driven by a motor 115 and taking its supply from the room in which the apparatus is located.

A take-off duct 120 exhausts air from above grid 90 and is connected to a blower 122 driven by a motor indicated at 124. A branch duct 126 having a valve 128 is connected to duct 120 and introduces air at room temperature into duct 120. Blower 122 discharges into duct 130, which in turn discharges into manifold chamber 47.

*Example*

The following example illustrates without limitation a typical employment of the method and apparatus of this invention. This example deals with the production of catalytically active pellets made from aluminum trihydrate particles bound together with aluminum dihydrogen phosphate.

The motor 77 of blower 76 and furnace 80 are actuated to supply air to manifold chamber 70 and upwardly through opening 68 of grid 66 having a temperature as it enters fluidizing chamber 56 of 900° F. at a grid face velocity of 100 f.p.m. Motor 115 of blower 114 is actuated to introduce air at room temperature into manifold chamber 110 and upwardly through openings 92 in grid 90. The air is drawn out of chamber 56 by blower 122 pulling through duct 120 and enters chamber 2 at a grid face velocity of 110 f.p.m. Valve 128 is adjusted so that the air delivered by blower 122 through conduit 130 into chamber 2 will have a temperature of 200° F.

Substantially spherical pellets 134 having a diameter of from about .033″ to about .055″ and containing aluminum trihydrate bound together with aluminum dihydrogen phosphate are fed at a rate of 0.3 lb./min. for each inch of bed width through pipe 28 and down chute 26 into fluidizing chamber 2 where the pellets are entrained by the gas passing upwardly through openings 20 in grid 18 and fluidized. The fluidized pellets 134 gradually move towards the discharge opening 30 of chamber 2. Each pellet remains in chamber 2 for two minutes or very close thereto which is sufficient time to convert the aluminum dihydrogen phosphate to aluminum phosphate to properly harden the pellets and then is collected in container 42.

The pellets collected in container 42 are introduced from pipe 51 into chute 49 at the rate of 0.15 lb./min. and pass through opening 52 to be entrained and fluidized by the hot air jets formed by the air passing upwardly through openings 68 in grid 66. Here again, the pellets move progressively away from their point of introduction into chamber 56. The trim of travel for each pellet from the beginning of grid 66 to the discharging end thereof is five minutes which is sufficient time for the 900° F. air to decompose the aluminum trihydrate to a mixture of AlO(OH) and $Al_2O_3$ to make the pellets catalytically active.

After release by the air jets passing upwardly through grid 66, the pellets pass under partition 86 and are fluidized by the relatively cool air passing upwardly through grid 90 at a velocity of 90 f.p.m. The pellets as they are being cooled are advanced towards opening 93 and are discharged through housing 94 into container 106. Each pellet remains over grid 90 for a period of 1.5 minutes which is sufficient to cool them down to approximately 130° F., at which temperature they can be readily handled.

The thus-formed pellets are cooled to room temperature and then placed in a water solution containing 1.92 moles per liter of each of copper nitrate and chromium nitrate. The pellets are permitted to soak in this solution for one-half hour at which time they are removed from the solution. The pellets are then introduced into chute 49 and passed into chamber 56 through opening 52 at a rate of 0.5 pound per minute per inch of bed width and are entrained and fluidized by the hot gas jets passing upwardly through opening 68 in grid 66. The hot gas for this step additionally contains 0.15% propane introduced through pipe 134 controlled by valve 136 and is at a temperature of 800° F. The gas has a grid face velocity of 110 f.p.m.

The pellets pass under partition 86 and are cooled by the relatively cool air passing through grid 90 which has a grid face velocity of 90 f.p.m. As the pellets are being cooled, they are advanced towards opening 93 and are discharged through housing 94 into container 106. Each pellet remains over grid 90 for one and one-half minutes which cools them down to below 120° F. at which temperature they can be readily handled.

The thus reduced, dried and cooled catalyst pellets containing copper and chromium are ready for use, for example, in an automobile exhaust purifier.

It will be appreciated that while the processing of the metal impregnated pellets has been described with respect to the employment of chamber 56, it will be understood that normally a separate apparatus identical with the apparatus embodying chamber 56 will be employed in order to permit the simultaneous processing of the catalyst base pellets and the said base pellets when impregnated with catalyst metal.

It is not desired to be limited except as set forth in the following claims.

What is claimed is:

1. The steps in the method of forming a catalyst comprising maintaining a multiplicity of jets of air at a temperature in the range of from about ambient to about 400° F. passing upwardly into the bottom of a fluidizing zone having an inlet end and a discharge end, introducing metal hydroxide metal acid phosphate pellets into the inlet end of said fluidizing zone, said air fluidizing said pellets and converting the metal acid phosphate to metal phosphate, the said fluidized pellets progressively passing through said zone and discharging through the discharge end of the zone, maintaining a multiplicity of jets of air at a temperature in the range of from about 500° F. to about 1400° F. discharging upwardly into the bottom of a second fluidizing zone, introducing pellets passed through the first fluidizing zone into the second fluidizing zone, said air in the second fluidizing zone fluidizing the pellets and forming a metal hydroxide-oxide mixture in the pellets, said fluidized pellets progressively passing through said second fluidizing zone and discharging through the discharge end thereof.

2. The method in accordance with claim 1 characterized in that the points of introduction of the jets in each fluidizing zone lie in a plane sloping downwardly away from the inlet end towards the discharge end of the zone.

3. The method in accordance with claim 2 characterized in that the velocity of the jets of gas as they pass into the bottom of the zones is in the range of from about 70 feet per minute to about 140 feet per minute.

4. The steps in the method of forming a catalyst comprising maintaining a multiplicity of jets of air at a temperature in the range of from about ambient to about 400° F. passing upwardly into the bottom of a fluidizing zone having an inlet end and a discharge end, introducing metal hydroxide metal acid phosphate pellets into the inlet end of said fluidizing zone, said air fluidizing said pellets and converting the metal acid phosphate to metal phosphate, the said fluidized pellets progressively passing through said zone and discharging through the discharge end of the zone, maintaining a multiplicity of jets of air at a temperature in the range of from about 500° F. to about 1400° F. discharging upwardly into the bottom of a second fluidizing zone, introducing pellets passed through the first fluidizing zone into the second fluidizing zone, said air in the second fluidizing zone fluidizing the pellets and forming a metal hydroxide-oxide mixture, said fluidized pellets progressively passing through said second fluidizing zone and discharging through the discharge end thereof, impregnating the thus processed pellets with a salt of a catalyst metal, maintaining a multiplicity of jets of hot reducing gas passing upwardly into the bottom of a third fluidizing zone having an inlet end and a discharge end, introducing the impregnated pellets into the inlet end of said fluidizing zone, said gas reducing the catalyst metal salt and the said fluidized pellets progressively passing through said third fluidizing zone and discharging through the discharge end of the zone.

5. The method in accordance with claim 4 characterized in that the points of introduction of the jets in each fluidizing zone lie in a plane sloping downwardly away from the inlet end towards the discharge end of the zone.

6. The method in accordance with claim 5 characterized in that the gases are introduced into the zones at a rate of from about 70 feet per minute to about 140 feet per minute.

7. The steps in the method of forming a catalyst comprising maintaining a multiplicity of jets of air at a temperature in the range of from about 125° F. to about 212° F. passing upwardly into the bottom of a fluidizing zone having an inlet end and a discharge end, introducing aluminum trihydrate-aluminum dihydrogen phosphate pellets into the inlet end of said fluidizing zone, said air fluidizing said pellets and converting the aluminum dihydrogen phosphate to aluminum phosphate, the said fluidized pellets progressively passing through said zone and discharging through the discharge end of the zone, maintaining a multiplicity of jets of air at a temperature in the range of from about 800° F. to about 1200° F. discharging upwardly into the bottom of a second fluidizing zone, introducing pellets passed through the first fluidizing zone into the second fluidizing zone, said air in the second fluidizing zone fluidizing the pellets and forming AlO(OH) and $Al_2O_3$ from aluminum trihydrate in the pellets, said fluidized pellets progressively passing through said second fluidizing zone and discharging through the discharge end thereof.

8. The method in accordance with claim 7 characterized in that the points of introduction of the jets in each fluidizing zone lie in a plane sloping downwardly away from the inlet end towards the discharge end of the zone.

9. The method in accordance with claim 8 characterized in that the velocity of the jets of gas as they pass into the bottom of said zones is in the range of from about 70 feet per minute to about 140 feet per minute.

10. The steps in the method of forming a catalyst comprising maintaining a multiplicity of jets of air at a temperature in the range of from about 125° F. to about 212° F. passing upwardly into the bottom of a fluidizing zone having an inlet end and a discharge end, introducing aluminum trihydrate-aluminum dihydrogen phosphate pellets into the inlet end of said fluidizing zone, said air fluidizing said pellets and converting the aluminum dihydrogen phosphate to aluminum phosphate, the said fluidized pellets progressively passing through said zone and discharging through the discharge end of the zone, maintaining a multiplicity of jets of air at a temperature in the range of from about 800° F. to about 1200° F. discharging upwardly into the bottom of a second fluidizing zone, introducing pellets passed through the first fluidizing zone into the second fluidizing zone, said air in the second fluidizing zone fluidizing the pellets and forming AlO(OH) and $Al_2O_3$ from aluminum trihydrate in the pellets, said fluidized pellets progressively passing through said second fluidizing zone and discharging through the discharge end thereof, impregnating the thus processed pellets with a salt of a catalyst metal, maintaining a multiplicity of jets of hot reducing gas passing upwardly into the bottom of a third fluidizing zone having an inlet end and a discharge end, introducing the impregnated pellets into the inlet end of said fluidizing zone, said gas reducing the catalyst metal salt and the said fluidized pellets progressively passing through said third fluidizing zone and discharging through the discharge end of the zone.

11. The method in accordance with claim 10 characterized in that the points of introduction of the jets in each fluidizing zone lie in a plane sloping downwardly away from the inlet end towards the discharge end of the zone.

12. The method in accordance with claim 11 characterized in that the gases are introduced into the beds at a rate of from about 70 feet per minute to about 140 feet per minute.

References Cited by the Examiner
UNITED STATES PATENTS

| | | | |
|---|---|---|---|
| 1,563,661 | 12/25 | Sawkins | 34—129 |
| 1,914,557 | 6/33 | Craver | 252—461 |
| 2,323,289 | 7/43 | Anderson et al. | 34—129 |
| 2,440,236 | 4/48 | Stirton | 252—437 |
| 2,454,056 | 11/48 | Greger | 252—437 |
| 2,481,226 | 9/49 | Krebs | 23—1 |
| 2,507,625 | 4/50 | Ehrhardt | 252—437 |
| 2,967,156 | 1/61 | Talvenheimo | 252—437 |

MAURICE A. BRINDISI, *Primary Examiner.*

JULIUS GREENWALD, *Examiner.*